US008364704B1

(12) United States Patent
Brique et al.

(10) Patent No.: US 8,364,704 B1
(45) Date of Patent: Jan. 29, 2013

(54) METHOD AND SYSTEM FOR TRANSMITTING MESSAGES FOR DATABASE

(75) Inventors: Olivier Brique, Le Mont-sur-Lausanne (CH); Christophe Nicolas, Préverenges (CH); Marco Sasselli, Chardonne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1272 days.

(21) Appl. No.: 10/049,696

(22) PCT Filed: Sep. 6, 2000

(86) PCT No.: PCT/IB00/01259
§ 371 (c)(1),
(2), (4) Date: Feb. 15, 2002

(87) PCT Pub. No.: WO01/20492
PCT Pub. Date: Mar. 22, 2001

(30) Foreign Application Priority Data

Sep. 10, 1999 (CH) ........................................ 1660/99

(51) Int. Cl.
*G06F 17/30* (2006.01)
(52) U.S. Cl. ........ 707/770; 707/638; 707/805; 707/912; 370/390; 704/9
(58) Field of Classification Search ................... 707/3, 5, 707/7, 8, 10, 100, 200, 2, 102, 104.1, 203, 707/638, 669, 770, 805, 912; 370/389, 390; 427/496, 503, 504, 508, 510, 515; 522/99, 522/148, 172, 96, 103, 107; 433/226, 228.1; 704/9
See application file for complete search history.

(56) References Cited

U.S. PATENT DOCUMENTS

| | | | | |
|---|---|---|---|---|
| 4,761,136 A | | 8/1988 | Madhavan et al. ............ 433/214 |
| 5,112,884 A | * | 5/1992 | Hanke ............................ 523/116 |
| 5,302,627 A | * | 4/1994 | Field et al. ...................... 522/13 |
| 5,395,954 A | * | 3/1995 | Soria et al. ...................... 556/10 |
| 5,461,088 A | * | 10/1995 | Wolf et al. ..................... 522/103 |
| 5,514,232 A | * | 5/1996 | Burns ............................. 156/64 |
| 5,925,689 A | | 7/1999 | Orlowski et al. ............. 522/182 |
| 6,033,223 A | * | 3/2000 | Narusawa et al. ............ 433/226 |
| 6,117,612 A | * | 9/2000 | Halloran et al. .............. 430/269 |
| 6,167,045 A | * | 12/2000 | Pirovano et al. ............. 370/389 |
| 6,200,732 B1 | * | 3/2001 | Tamura et al. ............. 430/284.1 |
| 6,203,966 B1 | * | 3/2001 | Tamura et al. ............. 430/284.1 |
| 6,251,557 B1 | * | 6/2001 | Lapin et al. .................. 430/269 |
| 6,286,004 B1 | | 9/2001 | Yoshiura et al. |
| 6,287,745 B1 | * | 9/2001 | Yamamura et al. .......... 430/269 |
| 6,370,143 B1 | * | 4/2002 | Yamagishi ................... 370/390 |
| 6,413,698 B1 | * | 7/2002 | Tamura et al. ............. 430/284.1 |
| 6,446,092 B1 | * | 9/2002 | Sutter .......................... 707/203 |

FOREIGN PATENT DOCUMENTS

| | | |
|---|---|---|
| DE | 39 03 407 A1 | 8/1990 |
| DE | 41 33 494 A1 | 4/1993 |
| EP | 0491069 A | 6/1992 |
| FR | 2696854 A | 4/1994 |
| JP | 11-234269 | 8/1999 |
| JP | 04-302040 | 5/2009 |
| WO | WO 00/21488 | 4/2000 |

OTHER PUBLICATIONS

Patent Abstracts of Japan, vol. 1997, No. 10, (Oct. 31, 1997) & JP 09 143021 A (Kuraray Co. Ltd.) (Jun. 3, 1997) abstract.

* cited by examiner

*Primary Examiner* — Shahid Alam
(74) *Attorney, Agent, or Firm* — Stuart J. Friedman

(57) ABSTRACT

For updating shared databases on a subscriber network, a managing center sends messages addressed to each of these bases. When one requires to address a great number of databases, the time to accede to each of them increases considerably considered the necessity to repeat the information to ensure the good reception of messages. Instead of addressing by name each database, it is proposed to transmit criteria in which a certain number of databases recognize themselves and apply a selective updating on these bases.

5 Claims, No Drawings

METHOD AND SYSTEM FOR TRANSMITTING MESSAGES FOR DATABASE

The present invention concerns a process and system of database updating, in particular for a database with unidirectional access.

BACKGROUND OF THE INVENTION

In a system comprising a managing centre having a main database, and a plurality of subscribers each one having a subscriber's database over a wide territory, it is known to send data by phone or hertz route to update the database of these subscribers. These messages address, either to all the subscribers, or to a particular subscriber, that is to say, that they contain a subscribed module address.

As some systems of this type do not use return path towards the managing centre such as by modem for example, it is difficult to know if the sent data have arrived correctly. In this way, it is obliged to repeat these messages periodically in order to ensure that the message has arrived property at destination at least once.

One can easily imagine what the consequence is in a system managing a large number of subscribers, for example 2 to 3 million, the repetition of these messages being able to saturate rapidly the transmission capacity.

In a system of this type, the transmission channel is used more for transmission of useful data such as audio, video or data and managing data, for subscriber databases, and can occupy only a very limited bandwidth.

Such a system is described in the European patent EP 0 616 714, and treats the problem of the updating of a database defined in a smart card. The controls are of simple type and are all destined to enter data in this database. Even if this structure has an advantage on the previous solutions, that is to say based on a structure fixed by the supplier of the software, it do not permit the personalization or special processing.

Another example of the limits of the existing addressing is disclosed in EP 0 491 069. Each database includes a single identifier used to address this database. Thus, when a large number of databases must be updated, they must be addressed sequentially.

One realizes that one is rapidly limited if one wants to use more sophisticated functions, for example to offer one month of free subscription for a new channel to all the subscribers having subscribed for at least one year. In such a case, according to the present transmission technique, one determines on the main database in the managing centre, the list of subscribers answering this criterion, and one formats and then sends on the network a message to each chosen subscriber, a message containing the address of the addressee.

One must not forget that these messages must be repeated periodically to assure that each subscriber has the possibility to receive it.

At present, such functions are not easily possible because they can completely saturate the system with the transmission of managing messages. The specific addressing is therefore used for initialising a subscriber or to update the same, following a call to the management centre.

When one considers the subscriber databases according to the prior art, one can see that these databases contain only information allowing the access to transmissions broadcasted. Said information or data called "systems" such as the subscriber number, are memorized independently. It is based on these data-systems that one determines if a message is addressed to the considered database. No request inside of the database is made, the test using only the systems information.

SUMMARY OF THE INVENTION

The aim of the present invention is to propose a process, which allows the transmission of messages which address to a previously non-defined subscriber's group.

This aim is fully reached by a process of transmission of messages of updating database between a managing centre and a plurality of shared database, each database comprising data-systems and useful data. According to the process of the invention, these messages comprise data and controls which condition the updating of a database according to one or more data either present or not in the said database and representing the useful data.

By useful data, the data to which the database has been provided is meant, on the contrary to data-systems, which define the structure of the base and allow to define its address or identifier.

When starting the service of such a database, this does not contain in principle any useful data while all the data-systems are defined.

According to the invention, this process allows to carry out complex operations directly on the useful data of each subscriber's base in order to determine if such transmitted data is addressed to this database.

Within the aforementioned example, the data related to the access authorization to the new channel are conditioned to a request on the contents of the base, in particular the date of the subscription of the referred subscription. Thus, the operations carried out in the managing centre determine the subscribers benefiting from the promotional offer, are carried out in the same way on the level of the database of each subscriber.

Due to this process, a subscriber's group not defined in advance (for example 120'000 football fans) can take advantage of a new sports channel (for example for a test period) by sending a single control message on the network. Previously, it would have been necessary to send 120.000 control messages on the network, a control message for each beneficiary subscriber.

The requests carried out by this control language can be simple, for example the subscription date of a subscription submission, or complex, for example a selection operation on several criteria.

It is known in Pay-TV systems to offer the possibility to buy the shows such as recent films or the transmission of a football match. The user, owing to the function "pay-per-view" debits his account to the video access supplier for visualization of his favourite transmission.

The database memorizes the transmissions bought for statistical purposes (for example financial) or for further consultation by the subscriber. Due to the process according to the invention, it is possible to propose a reduction, for example of 50%, on the purchase of the next transmission of the same type. This offer is contained in a message, which includes a complex request since it first extracts from the data of database relating to the transmissions bought previously, to carry out the necessary verifications and, according to the result of the verification, to enter in the base the information related to this new offer. All these operations are contained in a single message.

DETAILED DESCRIPTION OF THE INVENTION

In order to express this kind of message, a new message format is proposed in the frame of this invention that allows the transmission of complex controls. One can easily imagine that the transmission of a control cannot easily contain the request such as described previously. This is why a message containing a set of control blocks is proposed, each control block processing a single request and, according to the result, being able to decide the following sequence.

According to this form of message construction, a control block includes a request on the database allowing the use of several data contained in the database, a data or comparison data and an action according to the result of these comparisons.

According to the comparison result, by action, either the stop of the processing of the message (stop function), or the processing of the subsequent control block (continuous function) or the execution of the X block (jump function) is meant.

It is possible, owing to this structure, to carry out complex functions developed in a single message.

The present invention concerns also a formatting system of managing messages, preferably in evolved language such as SQL, and a transmission system of messages comprising a managing centre with its main database and a plurality of subscriber units, each unit comprising a database, the managing centre transmitting messages comprising data and controls, these latter conditioning the updating of the database according to one or more criteria bound to the contents of the database.

The system according to the invention transmits messages comprising requests which condition the updating of the database. This system uses the above described process.

This invention concerns also a language interpreter evolved for database designed to receive conditional updating messages, to carry out comparison operations on one or more criteria contained in the database and to update the database according to the result of the comparison.

The subscriber's module includes schematically a data receiver, either audio, video or numerical, a decoder able to separate the data of managing messages, these latter being directed towards a security module comprising the subscriber's database. In an embodiment, this module is directly installed in the subscriber module or, for security and cost reasons, this module is under the form of a detachable smart card. The subscriber database, similarly to the interpreter is located on this smart card. The interpreter receives from the decoder the managing messages serving to define the different rights connected to the service or emission providers.

The interpreter according to prior art has the task of organization and updating of the database. It receives the updating controls and determines the location where to store this information. An example of such an interpreter is described in EP 0 616 714. The interpreter according to the invention, not only organizes the database, but carries out also the request operations on said base in order to verify the updating conditions, and, if the format of the message is of the multiple control-blocks type, carries out the condition attached to this comparison which by memory allows, either to terminate the carrying out of the message, or to proceed with the subsequent block or jump to a certain block.

This kind of interpreter can be used as segmented database-manager or as a relational-type base. By segmented type base, a base for which one creates a sector by supplier of service and where one stores the rights related to this supplier in this section, is meant. By relational database, a base in which the information or data are stored in a certain place, only the link allowing to find them being connected to the describer of the related supplier, is meant. One can see that this kind of interpreter is not attributable to the kind of base and can apply to any base-structure.

In a particular form of the invention, the requests defining the conditional updating base on the single number of subscribers, the number pertaining to a group, for example the postal code, or the subscribed subscription.

According to an aspect of the invention, all the parameters of said systems are stored in the database.

An advantage of this kind of message is to suppress the repeating effects. In fact, we have seen that the controls are sent several times to ensure that they have been properly received by the subscriber unit. In this case, according to the prior art, an updating will be carried out many times, unnecessary using the processing capacities of the database interpreter. To avoid this, it is sufficient to add a condition in order that the updating will be carried out if it has not still been made.

Another advantage of this invention is to be able to proceed to verifications of the subscriber database by sending messages having the task to carry out a certain number of operations on the data of this subscriber, and when the result differs to that expected, an action can be ordered.

In a particular embodiment of the invention, the result of the request can cause a notification of the security module towards the subscriber module, to carry out an action. By action is meant, for example, a notice of a message on the display, a ringing or more generally a sound signal, or even the formation of a phone call on a modem connected to the public phone network.

The invention claimed is:

1. A method for transmitting messages over a communication network to update a large quantity of network user terminal databases, the messages being transmitted unidirectionally from a managing center to a plurality of distributed user databases, each distributed user database being stored in a user terminal, said method comprising the steps of:
   providing identical messages without any database addressing to be unidirectionally transmitted from the managing center, wherein each identical message includes conditional controls that include queries for searching useful data present in distributed user databases;
   transmitting said messages from the managing center over a unidirectional connection to a plurality of distributed user databases;
   allowing individual user terminals to execute said queries and to search the useful data present in each distributed user database for predetermined data; and
   conditionally updating each distributed user terminal database separately according to the results of said searching of the useful data present in each distributed user database and without a return message from the databases to the managing center regarding the performing of the conditional updating.

2. The method of transmitting messages of claim 1, wherein said distributed user databases are integrated in Pay-TV reception subscriber's units and wherein the predetermined data comprise the reception rights of a subscriber.

3. The method of transmitting messages of claim 1, wherein said updating messages comprise a set of control blocks comprising data and controls, and wherein said updating messages consist of carrying out comparison operations between the data and the contents of the distributed user database and determining an action depending on the comparisons results, either to update the database, carry out the subsequent control block, to jump to another control block, or to terminate the message handling.

4. The method of transmitting messages of claim 3, wherein each distributed user database is connected to a Pay- TV subscriber module and wherein the action includes returning a message towards the subscriber module for carrying out in said module an event including at least one of a notice of a message on a TV display, a sound signal, and a phone call on a modem connected to a public network.

5. The method of transmitting messages of claim 1, wherein the database is divided or is of a relational type RDB.

\* \* \* \* \*